March 31, 1931.  F. MOTT  1,798,484

PROTECTIVE CASING FOR PNEUMATIC TIRES

Filed June 9, 1928  2 Sheets-Sheet 1

Inventor:
Floyd Mott
by F. J. Geisler
Atty.

March 31, 1931. F. MOTT 1,798,484
PROTECTIVE CASING FOR PNEUMATIC TIRES
Filed June 9, 1928 2 Sheets-Sheet 2
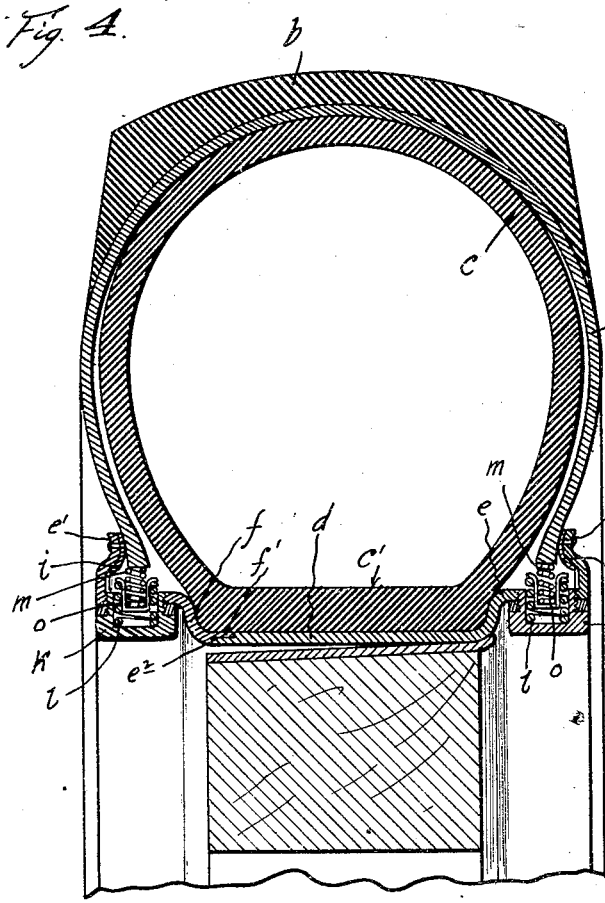
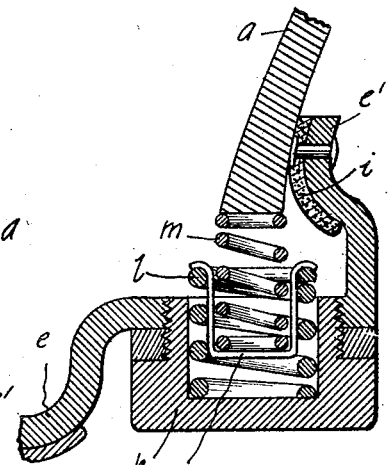
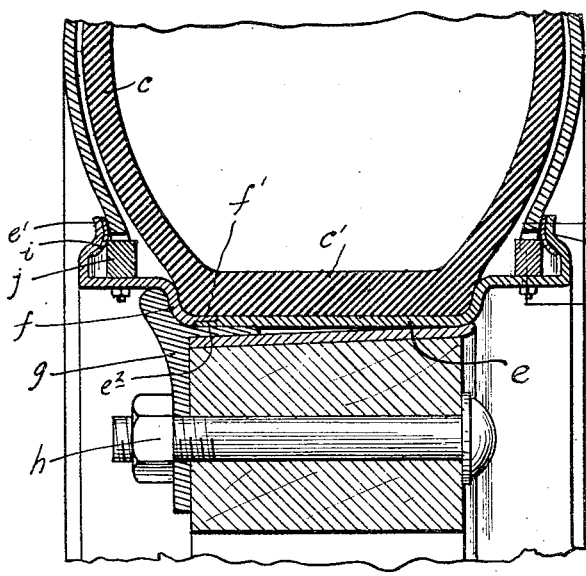
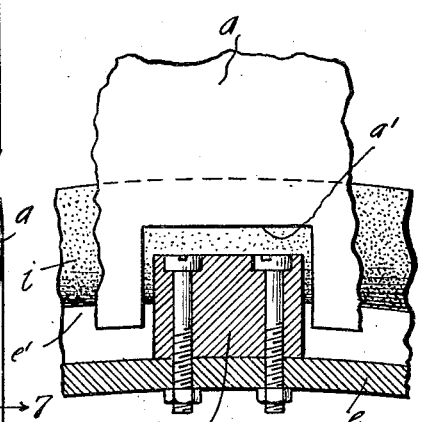
Inventor:
Floyd Mott Patented Mar. 31, 1931

1,798,484

UNITED STATES PATENT OFFICE

FLOYD MOTT, OF PORTLAND, OREGON

PROTECTIVE CASING FOR PNEUMATIC TIRES

Application filed June 9, 1928. Serial No. 284,219.

My invention relates to pneumatic vehicle tires and to inflexible protective floating casings therefor.

The object of my invention is to provide a practical, puncture proof, easily mounted and demounted metal casing for pneumatic vehicle tires, to eliminate "blow-outs," reduce the wear of the road surface on the tire to a minimum, and to provide greater bearing surface for the pneumatic tire, thereby to increase the resiliency and efficiency of the tire in absorbing shocks from the road surface, and thus making the vehicle ride more easily and smoothly, than with the usual flexible rubber casing.

I attain my objects by the combination comprising a circular annular metallic casing, adapted to enclose a pneumatic tire. The casing is mounted on circumferentially spaced radial springs carried by a rim removably secured to the felly of the vehicle wheel, and adapted to hold the casing in floating relation to the vehicle wheel. The casing however being normally supported by the tire when inflated, and by the springs when deflated, whereby more or less resiliency is provided for the tire under all conditions.

Further, the said tire is adapted when inflated to bear only against, and support the central peripheral portion of the casing, so that the sides of the tire do not normally touch the side walls of the protective casing, except when compressed by a shock from the road surface while traveling, and thus the shock-absorbing ability of the tire is greatly increased.

A further object of my invention is to provide a substantially stiff, protective casing adapted to carry the load of the vehicle, should the tire become deflated, and still provide a sufficient degree of resiliency to the road surface, thereby to render it unnecessary to change the tire while traveling to the next station.

These objects and other incidental features of my invention as they may appear and the details of construction and mode of assembly and operation thereof, are hereinafter fully described with reference to the accompanying drawings.

In the drawings:

Fig. 4 shows a section taken on the line 4—4 of Fig. 1 and illustrates certain details of construction;

Fig. 5 shows a section taken on the line 5—5 of Fig. 1 and illustrates further details of construction;

Fig. 6 shows a fragmentary enlarged cross section, the coiled springs and their seats as illustrated in Fig. 4; and Fig. 7 shows in a section taken on the line 7—7 of Fig. 5 the locking means provided for holding the protective casing against circumferential movement relative to the wheel.

Figure 1:
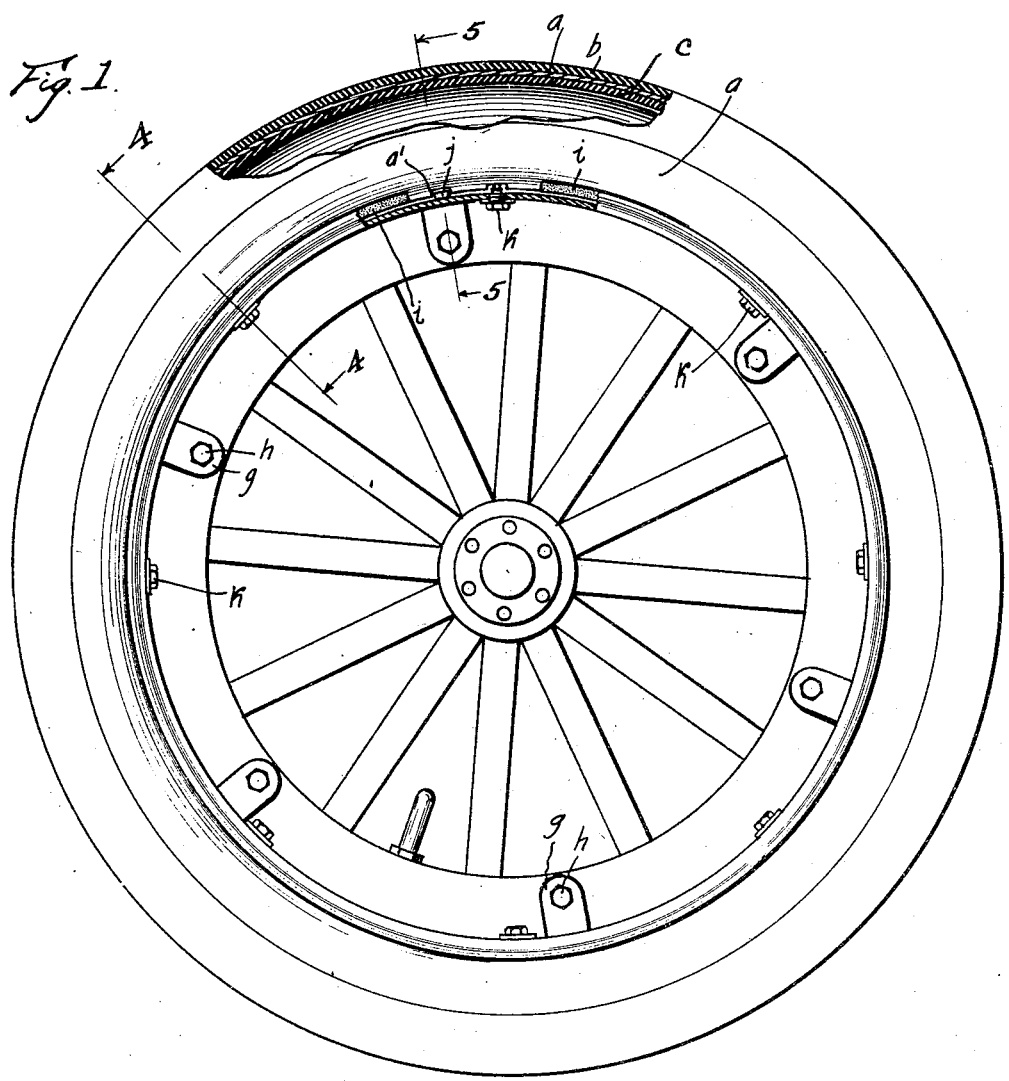
Fig. 1 shows a side elevation of a vehicle wheel and illustrates my protective casing mounted thereon.
Figures 2, 3:
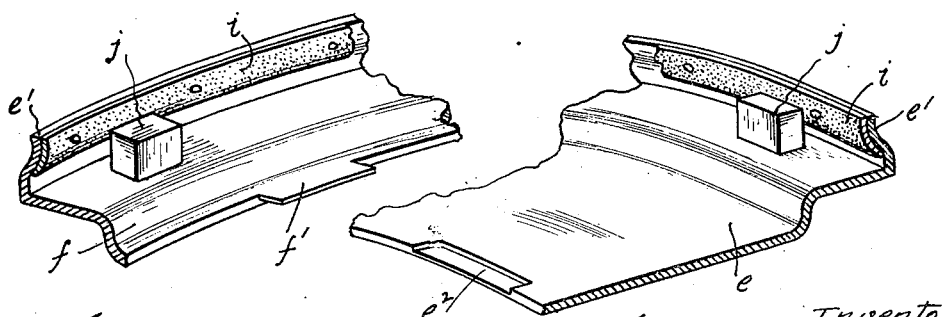
Figs. 2 and 3 show perspective fragmentary portions of the auxiliary rim.

Referring to the figures my invention comprises a ring-like protective metallic casing $a$, U-shaped in cross section and provided with a rubber tread $b$ and mounted over a pneumatic tire $c$, which is similar in shape to the well-known single tube bicycle tire and is composed of two ply rubber re-enforced at $c'$ to prevent it expanding and being caught under the edges of the casing.

An auxiliary circular inflexible rim $d$, preferably of metal is provided, adapted to be removably secured to the inner circumference of the casing and comprises on one edge an offset portion $e$ provided with an upturned inward curved flange $e'$. A similar, but removable circular flange $f$ is adapted to be fitted to the other edge of the rim and held against circumferential movement relative to each other, by a tongue $f'$ in the adjacent edge of the flange and a slot $e2$ in the adjacent edge of the rim.

The rim $e$ and the flange $f$ are held together on the felly of the wheel by clamps $g$ and bolts $h$, in the usual manner of securing a demountable rim on a vehicle wheel.

The flanges $e'$ and $f$ are both provided with circumferentially spaced projections $j$ which are seated in recesses $a'$ in the edges of the casing, but which do not normally touch the sides of the said recesses thus preventing circumferential movements of the casing relative to the rim but not interfering with a slight limited radial movement of the casing.

Radially and circumferentially arranged hollow cap screws $k$ are provided in the rim, and coil springs $l$ are mounted in the hollow portions. Relatively smaller and lighter coil springs $m$ are mounted within the springs $l$ on U-shaped members $o$.

A suitable layer of fabrics $i$ is provided on the inner surfaces of the flanges $e'$ at the point where the said flanges bear against the casing to reduce wear and keep out dirt.

The inner edge of the casing bears against the outer ends of the lighter springs $m$ which normally are slightly compressed and hold the casing spaced from the rim, so as to prevent free radial movement of the casing on the rim.

When the tire $c$ is inflated, the casing $a$ will be supported by the central peripheral portion of the tire, that is approximately the middle one-third of the tire, and the springs $m$ are under only slight compression.

Should the tire $c$ become deflated, then the weight of the vehicle will be supported by the springs $l$, the lighter springs $m$ being fully compressed, and the full compression of the springs $m$ tend to equalize, that is act as shock-absorbers, for the successive compression of the heavier springs $l$, by their resultant expansions as the weight of the vehicle is shifted successively to the next set of springs. This effect is especially promoted by arranging the springs oppositely and equally spaced about the circumference of the casing.

To provide for the slight circumferentially displacement of the casing on the springs, as the weight is carried at successive points on its circumference, a limited, but sufficient amount of lateral movement is permitted for the springs $m$ on the edges of the casing.

The projections $j$ and recesses $a'$ serve to lock the casing on the rim, but at the same time do not prevent such circumferential movement.

To mount my casing, the tire is inserted, deflated, and the rim slipped onto the felly of the wheel, with the flange $e'$ on the far side, then the casing and tire is mounted on the rim, with the projections $j$ in the recesses $a'$ on the far side.

The flange $f$ is then put in place, so that the tongue $f'$ fits in the slot $e2$ and the projections $j$ fit into the recesses $a'$.

The clamps are then bolted onto the felly at the wheel and the tire is ready to be inflated and the vehicle put into use.

By this construction and arrangement a low pressure tire may be used, since the supporting surface of the tire is relatively great to the volume of air contained in the tire $c$.

I claim:

1. In a protective casing for pneumatic tires, the combination of a ring, U-shaped in cross section of substantially non-puncturable inflexible material inclosing the tread and both sides of a tire, an auxiliary rim comprising longitudinally divided sections provided with lateral portions terminating in perpendicular flanges engaging the sides of the said ring at their basal edges, and circumferentially spaced coiled springs seated on said rim and bearing against the basal edges of the ring thereby holding the latter in floating relation to the rim.

2. In a protective casing for pneumatic tire, the combination of, a ring, U-shaped in cross section of substantially non-puncturable inflexible material inclosing the tread and both sides of a tire, an auxiliary rim comprising longitudinally divided sections provided with lateral portions terminating in perpendicular flanges engaging the sides of the said ring at their basal edges, circumferentially spaced sockets in said lateral portions, coiled springs seated in said sockets and bearing against the basal edges of the ring thereby holding the latter in floating relation to the rim, and said sockets being threaded into said lateral portions of the rim whereby the said coiled springs may be initially compressed.

3. In a protective casing for pneumatic tires, the combination of, a ring, U-shaped in cross section of substantially non-puncturable inflexible material inclosing the tread and both sides of a tire, an auxiliary rim comprising longitudinally divided sections provided with lateral portions terminating in perpendicular flanges engaging the sides of the said ring at their basal edges, circumferentially spaced sockets in said lateral portions, coiled springs seated in said sockets and bearing against the basal edges of the ring thereby holding the latter in floating relation to the rim, said sockets being threaded into said lateral portions of the rim whereby the said coiled springs may be initially compressed, and means holding the ring against circumferential movement on said rim.

FLOYD MOTT.